J. H. SKELTON.
NUT LOCK.
APPLICATION FILED MAY 12, 1910.
999,528.
Patented Aug. 1, 1911.
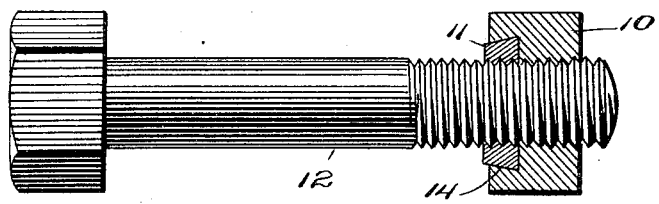
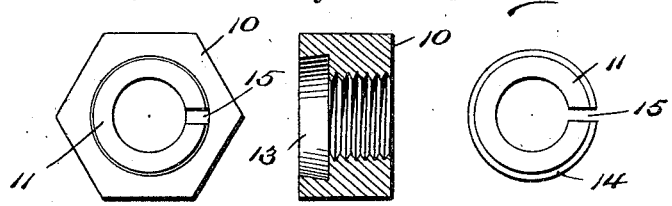
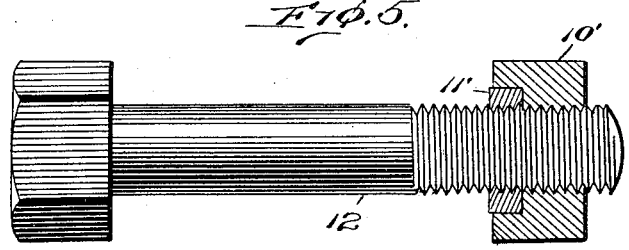

UNITED STATES PATENT OFFICE.

JOHN H. SKELTON, OF BAYONNE, NEW JERSEY.

NUT-LOCK.

999,528.    Specification of Letters Patent.    Patented Aug. 1, 1911.

Application filed May 12, 1910. Serial No. 560,937.

*To all whom it may concern:*

Be it known that I, JOHN H. SKELTON, a citizen of the United States, residing at Bayonne, in the county of Hudson and State of New Jersey, have invented certain new and useful Improvements in Nut-Locks; and I do hereby declare the following to be a full, clear, and exact description of the invention, such as will enable others skilled in the art to which it appertains to make and use the same.

This invention relates to interlocking jam and nut locks and has for an object to provide two nuts interengaged with each other to permit independent motion so arranged that the two nuts will operate as jam nuts and further so that the combined nuts serve as nut lock.

A further object of the invention is to provide the main nut with a tapered recess with the auxiliary nut provided with tapered sides to correspond with the tapered sides of the recess but deeper than such recess in such manner that when seated upon a bolt the nuts serve as jam nuts and further so that the tapered or inclined sides of the recess serve as a cam to contract the auxiliary nut to grip the bolt.

With these and other objects in view, the invention comprises certain novel constructions, combinations and arrangements of parts as will be hereinafter fully described and claimed.

In the drawings:—Figure 1 is a view of a conventional bolt in side elevation showing the nuts thereon in diametrical section. Fig. 2 is a view in plan of the under side of the combined nuts. Fig. 3 is a view in top plan of the auxiliary nut or collar. Fig. 4 is a diametrical sectional view of the main nut showing the tapered recess. Fig. 5 is a view of a conventional bolt in side elevation showing a slightly modified form of nut and auxiliary nut.

Like characters of reference designate corresponding parts throughout the several views.

The main nut 10 and auxiliary nut 11 hereinafter spoken of as a collar for the purpose of differentiating from the main nut 10 are adapted to be used upon any ordinary or conventional bolt shown at 12.

The nut 10 is provided in its under side with a socket shown as a whole at 13 having tapered side walls, the socket being thus formed of greater diameter at the bottom than at the surface. The nut is screw-threaded to be seated upon the bolt in the usual manner.

The collar 11 is provided with tapered sides 14, the taper being such as to properly engage the tapered walls of the recess 13 and is cut to provide an opening 15 which permits the collar to be shut up so that it may be inserted within the recess 13 and after being so inserted is expanded either by the resiliency of the material itself or mechanically as occasion may require. The proportions of the nut and collar are such that when the collar is expanded the threaded bore of the collar is slightly greater in diameter than the threaded bore of the nut so that it moves freely upon the threaded portion of the bolt 12. With the collar seated in the recess 13 the nut is screwed upon the threaded portion of the bolt in substantially the usual manner until the edge of the collar engages against the surface to be secured, such contact preventing the inner surface of the nut from contacting with such surface by reason of the fact that the collar 11 is thicker than the recess 13 and extends beyond the surface of the nut as indicated at Fig. 1.

When the collar 11 contacts with the fish plate or other surface which is to be secured the continued rotation of the nut forces the collar more firmly against the plate by reason of the fact that the collar is somewhat loosely seated upon the threaded portion of the bolt which permits some play upon the threads. It will thus be seen that the nut serves as a jam nut for the collar which is in fact a nut and has the usual effect of jam nuts similarly used. If now the nut 10 becomes loosened the tapered sides of the recess engage the tapered walls of the collar and as the nut tends to move outwardly upon the bolt the effect is the tightening of the collar to grip more firmly upon the bolt and by reason of the tapered engagement of the collar with the nut to prevent the further movement of the nut. In other words the more the nut tends to unscrew the greater the pressure upon the collar to grip the bolt and the resistance of the collar to unscrewing and the unscrewing of the nut is thereby similarly increased.

At Fig. 5 a form is shown wherein the nut 10′ is provided with a recess having straight or parallel walls and the collar formed with cylindrical walls. The form shown at Fig. 5 serves only as combined jam nuts the proportion of the collar being such as to fit quite snugly in the recess and to be moved with the nut in the process of seating upon the threaded portion of the bolt until the collar engages the work when the continued action of the nut serves to force the collar more firmly to seat and to perform the function of a jam nut. The forcing of the collar 11' to seat serves to expand such collar by reason of the inclined surfaces of the threads having a cam effect thereon which more firmly grips the interior of the recess thereby serving as a retarder to the return movement of the nut in the same manner but to perhaps a less degree than the form shown at Figs. 1 to 4 inclusive.

What I claim is:—

1. The combination with a nut having a recess formed in its underside concentric with the bore, of a split threaded washer seated in and thicker than the depth of the recess having its bore concentric and registering with the bore of the nut.

2. The combination with a nut having a dovetailed socket formed in its underside concentric with the bore, of a tapered split threaded washer seated and rotatable in the socket and extending beyond the face of the nut and having its threaded bore registering with the bore of the nut.

In testimony whereof I affix my signature in presence of two witnesses.

JOHN H. SKELTON.

Witnesses:
JOHN L. FLETCHER,
NANNIE MEEM.

Copies of this patent may be obtained for five cents each, by addressing the "Commissioner of Patents, Washington, D. C."